| (12) | United States Patent | (10) Patent No.: | US 7,953,795 B2 |
|---|---|---|---|
| | Keren | (45) Date of Patent: | May 31, 2011 |

(54) METHOD AND APPARATUS FOR PARTICIPATING IN A CONFERENCE SESSION OVER A DATA COMMUNICATION NETWORK

(75) Inventor: Ori Keren, Kiriat Ono (IL)

(73) Assignee: Interwise Ltd., Airport City (IL)

( * ) Notice: Subject to any disclaimer, the term of this patent is extended or adjusted under 35 U.S.C. 154(b) by 437 days.

(21) Appl. No.: 11/648,978

(22) Filed: Jan. 3, 2007

(65) Prior Publication Data

US 2008/0162635 A1    Jul. 3, 2008

(51) Int. Cl.
*G06F 15/16* (2006.01)

(52) U.S. Cl. ........ 709/204; 709/203; 709/205; 709/227; 709/236

(58) Field of Classification Search ................... 709/204
See application file for complete search history.

(56) References Cited

U.S. PATENT DOCUMENTS

| 6,343,313 | B1 * | 1/2002 | Salesky et al. ............... 709/204 |
| 6,590,603 | B2 * | 7/2003 | Sheldon et al. ............ 348/14.09 |
| 6,628,767 | B1 * | 9/2003 | Wellner et al. ............ 379/202.01 |
| 6,760,750 | B1 * | 7/2004 | Boneh et al. .................. 709/204 |
| 7,130,883 | B2 * | 10/2006 | Zhu et al. ..................... 709/204 |
| 7,167,898 | B2 * | 1/2007 | Sato et al. .................... 709/204 |
| 7,197,535 | B2 * | 3/2007 | Salesky et al. ............... 709/204 |
| 7,277,408 | B2 * | 10/2007 | Sorsa ............................ 370/328 |
| 7,418,476 | B2 * | 8/2008 | Salesky et al. ............... 709/204 |
| 7,533,146 | B1 * | 5/2009 | Kumar .......................... 709/205 |
| 2004/0158586 | A1 * | 8/2004 | Tsai ............................... 707/200 |
| 2004/0199580 | A1 * | 10/2004 | Zhakov et al. ............... 709/204 |
| 2007/0047715 | A1 * | 3/2007 | Madhusudan et al. ... 379/202.01 |
| 2007/0112913 | A1 * | 5/2007 | Bales ............................ 709/204 |

OTHER PUBLICATIONS

Definition of Thin Server, obtained from the Internet at: http://www.pcmag.com/encyclopedia_term/0,2542,t=thin+server&i=52840,00.asp.*
Using Ajax with websphere Portal, IBM, Jun. 2006.*
Mastering Ajax, Part I: Introduction to Ajax, IBM, Dec 2005.*
Ajax, A new approach to Web applications, by Jesse Garrett, Feb. 18, 2005.*
Mozilla developer center, Ajax, Getting started, Sep. 6, 2006.*
Mozilla developer center, Sep. 2005.*
Mozilla developer center, Ajax dates, obtained on Mar. 26, 2010.*

* cited by examiner

*Primary Examiner* — Kamal B Divecha

(74) *Attorney, Agent, or Firm* — Greenblum & Bernstein, P.L.C.

(57) ABSTRACT

A method and apparatus for participating in a conference session over a data communication network, the method comprising the steps of initiating a data communication conference session by a presenter with the an at least one viewer; establishing communication between the presenter and a thin server, wherein the thin server comprises an application for acting behind the scenes and enabling to transfer data.

6 Claims, 7 Drawing Sheets

METHOD AND APPARATUS FOR PARTICIPATING IN A CONFERENCE SESSION OVER A DATA COMMUNICATION NETWORK

RELATED APPLICATIONS

The present relates to U.S. patent application Ser. No. 11/509,253 filed on Aug. 24, 2006, titled "A SOFTWARE BRIDGE FOR MULTI-POINT MULTI-MEDIA TELECONFERENCING AND TELECOLLABORATION", the entire contents of the application is hereby incorporated by reference to the present application.

BACKGROUND OF THE INVENTION

1. Field of the Invention

The present invention relates generally to multimedia conferencing and more specifically to a multimedia conferencing apparatus comprising data communication and screen sharing based on a browser.

2. Discussion of the Related Art

Multimedia conferencing performed over data communication network (e.g. the Internet) uses personal computers (PCs), palm and other mobile devices, such as advanced cellular or other wireless phones and the like for communicating and exchanging messages. The messages can be of video, audio, screen sharing data, text content, other multi media of any kind or a combination thereof. Such messages are referred to as multimedia conferencing messages or messages. The messages are exchanged usually on-line and require adequate hardware and compatible software for communicating between two or more participants of the conference. Accordingly, each PC participating in a conference must be provided with minimal requirements regarding to hardware exploited by the multimedia conferencing exchange manager (i.e. the apparatus managing and controlling the exchange of multimedia conferencing messages). A managing apparatus comprising a software bridge is disclosed in detail in U.S. patent application Ser. No. 11/509,253 the disclosure of which is incorporated herein by reference to the present invention. Software obligatory requirements for PCs and the like comprise commercial operating systems, browsing software, and sufficient Random Access Memory or the like to enable the execution of said software. Additionally to said basic software requirements, the prior art for multimedia conferencing PCs participants software requires also installation of designated software compatible to the conferencing method and system.

Screen sharing sessions within multimedia conferencing sessions are usually commenced with an initiating computing apparatus (e.g. a PC, mobile device, and the like) presenting participant, referred to as the "initiator" or "engine", that "invites" one or more computing apparatus (e.g. a PC, mobile device, and the like) participants, referred to as "viewers", to participate in a conference in which a screen sharing session is taking place. The initiator is able to present to all participants a screen sharing view of data at any time during the conference session. A viewer can be a participant of a multimedia conference that can become an engine and control the shared data at a given time. The term viewer is given dynamically to all the participants of a session who are not the current engine when a screen sharing session is taking place. For example within the same session a first user can be a current Initiator and can initiate a screen sharing session, while the second and third users are the viewers in this part of the session. Then the initiator attribute roams to the second user and the second user then initiates another screen sharing session. In this session the first and third users are viewers.

The initiator and the participants communicate using a data communication network and are connected with a bridge to one or more servers designated for managing and handling data transmission required for activating multimedia conferencing, referred to as "conferencing bridge apparatus" or "bridge". In the field of communications, a bridge is a microprocessor controlled device which has a multiplicity of parts that can be interconnected in a variety of ways for connecting multiple telephone lines to each other. Conferencing bridge apparatuses are often used to establish multi-party conference calls. As the demand for conference call services increases, improvements are needed in the flexibility, responsiveness and data carrying capability of the service. A bridge may include any number of parts which can service many calls. Currently operating conferencing systems are typically supported via hardware based conference bridges with some of the systems allowing for software-controlled bridges. One unique multimedia conferencing communication managing apparatus comprising a softbridge as well as an ICS (Internet Protocol (IP) Communication Server) and an ICC (LP) Communication Center) are described within U.S. patent application Ser. No. 11/509,253, referred to as "the conference softbridge apparatus". One of the features of a conferencing session is the ability of a participant to share his desktop with other participants of the conferencing session. Thus, the desktop of an engine can comprise text, audio, video, and other data stream files of different types that can be shared with the viewers.

The conferencing session comprises transferring of data of the captured screen of the engine to the viewers, and later sending only updates of the said captured screen to the viewers. Such characteristic is enabled through the use of various computer programs such as ActiveX, Java, Flash plug-in and the like, that enable web accessible screen sharing over a data communication network. Use of such software does not usually require downloading additional software to a viewer at the client side during the screen sharing session. Nevertheless, such software requires initial installation on a client viewer apparatus. Thus, for example, the ActiveX computer program must be installed at the viewer before using ActiveX to provide screen sharing view. If the software is not initially installed no screen sharing will be possible. One example is flash that is a one time plug-in install that later requires further use scripts that do not require installation at the viewer. As for ActiveX and Java they require an "on demand" installation of the software which runs at the viewer.

Ajax, shorthand for Asynchronous JavaScript and XML, is a web development technique for creating interactive web applications. Ajax is designed to make web pages feel more responsive by exchanging small amounts of data with the server behind the scenes, so that the entire web page does not have to be reloaded each time the user makes a change. This is meant to increase the web page's interactivity, speed, and usability. Ajax is not a technology in itself, but a term that refers to the use of a group of technologies together. Some of the software technologies refer to styling information, to dynamically display and interact with the information presented, to exchange data asynchronously with the web server, for transferring data between the server and client files, these files may be created dynamically by some form of server-side scripting. The use of Ajax as well as alternative interactive software technologies acting behind the scenes and transferring data between server and client files within a multimedia conferencing system is referred hereafter also as "Ajax" or "Ajax Technology". The Ajax Technology can assist to minimize the download of data in some of the multimedia conferencing sessions taking place.

Accordingly, prior to commencing a multimedia conference installation of a designated software enabling conferencing is mandatory. Thus, participation of an unexpected guest (e.g. a new customer; a co-worker from another department; a supplier, and the like) will not be possible within a conference session without having suitable software installed. Consequently, requirement of pre-installed conference enabling software limits the usage and communication abilities of a multimedia conferencing. Additionally, the ever growing awareness of security measures imposed growing barriers (e.g. Firewall) within PCs, and computer networks for new software installation. Thus, said barriers hinder the capability (e.g. preventing accesses to the registry) to install new software installed for enabling multimedia conferencing.

In view of the drawbacks it is necessary to provide a viewer apparatus enabling easy access to screen sharing session within multimedia conferencing system. Furthermore, there is a need to provide a viewer apparatus that does not require installation of new software or software that will leave footprints on the registry or elsewhere on the Participant's machine. Furthermore, if files are downloaded, such should reside only in temporary or cache directories. Thus, there is a need to enable unexpected Viewer to participate in a multimedia conferencing session.

SUMMARY OF THE PRESENT INVENTION

It is an object of the present invention to provide a novel apparatus and method providing access and participation within a multimedia conference, including a screen sharing viewing apparatus.

An aspect of some of the embodiments of the invention relates to utilizing known multimedia conference systems. The apparatus disclosed enables any computing device comprising a browsing capability to participate in a multimedia conferencing session without software pre-installing requirements. Thus, a viewing computer device, the viewer, can hold a conference with almost any computing device.

In accordance with some aspects of the present invention, there is provided a method for participating in a conference session over a data communication network, the conference held with at least two participants computing devices that communicate using at least one server, the at least one server comprising a conferencing bridge apparatus, wherein at least one of the participants is a presenter and at least one of the participants is a viewer, the presenter presenting data to one or more participants, at least one viewer comprising a browser application with a rendering capability, the method comprising initiating a data communication conference session by the presenter with the at least one viewer; establishing communication between the at least one presenter and an at least one thin server, wherein the at least one thin server comprises an application for enabling to transfer data; establishing communication between the at least one viewer and the at least one thin server; and updating data shared by the presenter with the viewer communicating with the thin server.

In some exemplary embodiments, the application for enabling to transfer data is an application capable of updating the viewer with at least one image on a substantially continuous basis without the need to download specifically designed software for allowing the substantially continuous showing of a conferencing session.

In some exemplary embodiments, the application for enabling to transfer data is an ajax application.

In some exemplary embodiments, the browser of the at least one browser communicating with the at least one thin server, comprises a request component.

In some exemplary embodiments, the method further comprises the step of establishing communication by the browser and the request component requesting data update presented by the presenter.

In some exemplary embodiments, the method further comprises step of establishing communication by the server is performed periodically.

In other exemplary embodiments, the request component is a XML HTTP Request component.

In yet additional exemplary embodiments, the browser of the at least one browser communicating with the at least one thin server, comprises a component that communicates with an at least one hidden frame within a communication received from the server.

In some exemplary embodiments, the method further comprises the step of establishing communication by the browser and the request component requesting data update presented by the presenter.

In some exemplary embodiments, the step of establishing communication by the server is performed periodically.

In some exemplary embodiments, the method further comprises the viewer updating the at least one or more participants.

In other exemplary embodiments, the conferencing bridge apparatus comprises a softbridge.

In some exemplary embodiments, the browser application has rendering capability and is preferably running ECMA scripts and capable of presenting at least one image.

In accordance with yet another embodiment of the present invention there is provided an apparatus for participating in a conference session over a data communication network, the apparatus comprising, an at least two participants computing devices, an at least one server comprising a conferencing bridge apparatus used to communicate with at least two of the participants, the apparatus comprises a thin server comprises an application for enabling to transfer data; and at least one computing device of a participant comprising a browser application with a rendering capability for transferring scripts of data.

In some exemplary embodiments, the application for enabling to transfer data the application for enabling to transfer data is an application capable of updating the viewer with at least one image on a substantially continuous basis without the need to download specifically designed software for allowing the substantially continuous showing of a conferencing session.

In another exemplary alternative, the application for enabling to transfer data is an ajax application.

In other exemplary embodiments, the at least two presenters can be presenters during a conference session and at least one participant is a viewer communicating with the thin server.

BRIEF DESCRIPTION OF THE DRAWINGS

The present invention will be understood and appreciated more fully from the following detailed description taken in conjunction with the drawings in which.

DETAILED DESCRIPTION OF THE PREFERRED EMBODIMENT

A method and an apparatus for conducting a multimedia conference are disclosed. The method for participating within a conference session over a data communication network, the conference held with two or more participants' computing devices that communicate using a server, the server comprising a conferencing bridge apparatus, wherein one of the participants is a presenter and one or more of the participants are viewers, the presenter presenting data to one or more participants, at least one of the viewers comprises a browser application with a rendering capability. The exemplary preferred browser would be capable of running ECMA scripts code or the like, and presenting one or more images, in still or streaming format. The method comprising, initiating a data communication conference session by the presenter with the one or more viewers, establishing communication between at least one presenter and a thin server, wherein the thin server comprises an Ajax application or a like application for acting in the background and enabling transfer of data, establishing communication between the at least one viewer and the thin server; and updating data shared by the presenter with the viewer communicating with the thin server.

The disclosed apparatus comprises a presenter initiating computing device, a conference bridge apparatus, a computing thin client server, and one or more computing participants. In accordance with the present invention viewers are able to participate in a conference session regardless to the fact whether designated software for participating in a conference session was installed on the computing device they use. The computing participants comprise a standard browser application (e.g. Firefox, MS Explorer and the like) commonly installed on computing devices and does not require additional software installed (e.g. plug inns installed or other specifically installed software) in order to participate in a conference session. The browser application comprises a rendering capability. Such browser rendering capability would be sufficient for running ECMA scripts code or like code that interacts with the thin client server and for presenting images that reside on the thin client server. The disclosed apparatus and method enables any computing device comprising a browsing capability to participate in a multimedia conferencing session without software pre-installing requirements. Thus, a screen sharing viewing session can be held with almost any computing device.

Figure 1:
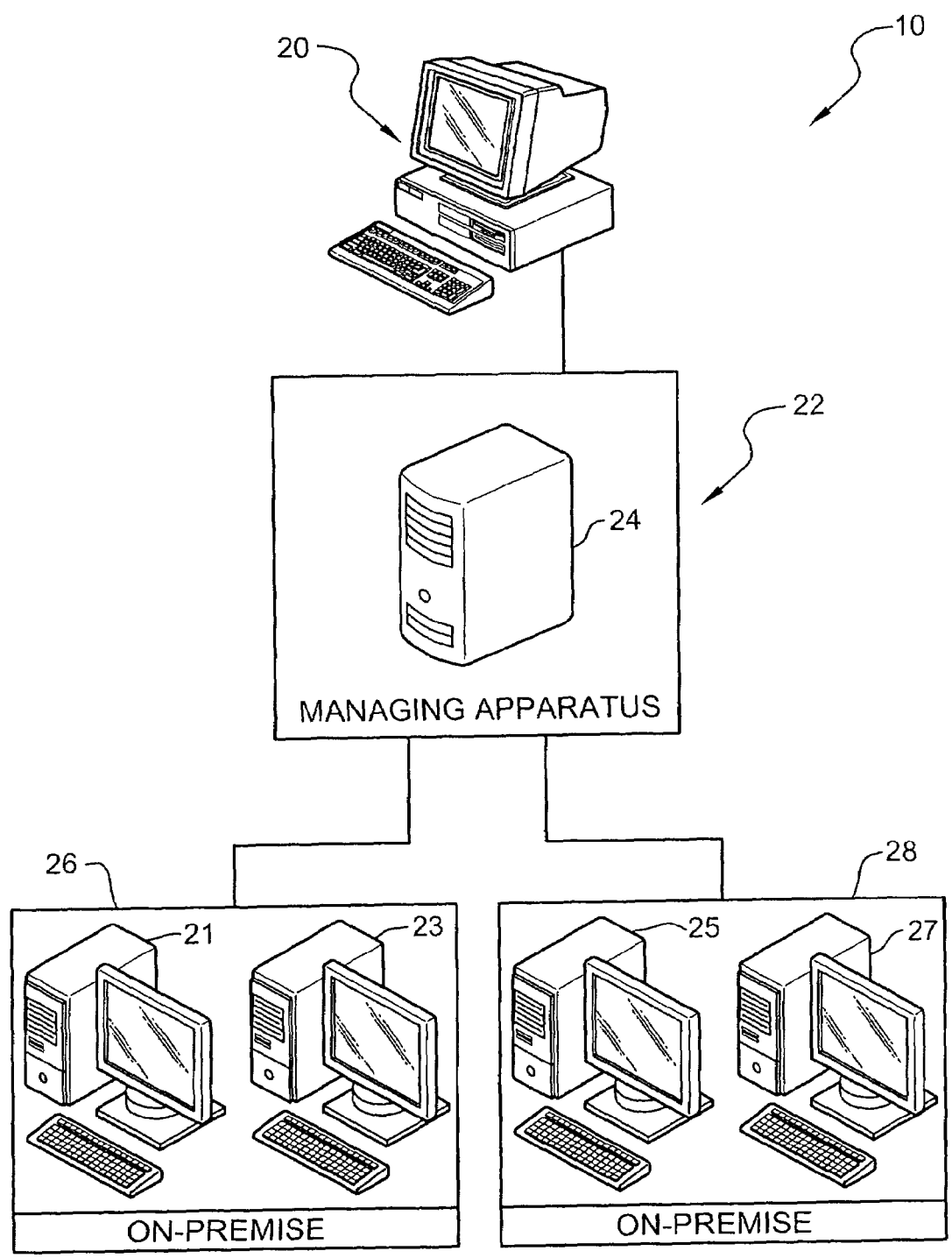
FIG. 1 is a schematic block diagram of the teleconferencing and tele-collaboration system, according to one preferred embodiment of the present invention.

FIG. 1 is a typical exemplary conferencing system 10, according to one preferred embodiment of the present invention. The conferencing system 10 comprises an initiating computing device 20, referred to as the Initiator or engine 20. Engine 20 may also be referred to as presenter. In addition system 10 can comprise a conference bridge apparatus 22, and on-premise sites 26, 28. On-premise sites 26, 28, typically comprise computing devices 21, 23, and 25, 27, respectively, referred to as the participants. The term on-premise site 26 and 28 refers to one or more client computing devices that may be located on the same premises or inter-connected to each other by a network. Conferencing system 10 supports and transfers all kinds of message exchange over a data communication network. Such networks can include Local Area Network (LAN) and Wide Area Network (WAN). The messages are typically transferred via conference bridge apparatus 22 to the on-premise sites 26, 28, and to the participants 21, 23, 25, 27. Conference bridge apparatus 22 comprises a server 24. One exemplary embodiment of the apparatus and method of the present invention utilizes a multimedia conference system disclosed in U.S. patent application Ser. No. 11/509,253 filed Aug. 24, 2006, titled "A Software Bridge For Multi-Point Multi-Media Teleconferencing And Telecollaboration", the entire contents of the application is incorporated herein by reference, and referred to as "the Conferencing System". One particular conferencing system disclosed within the Conferencing System provides a softbridge comprising an IP communication server (ICS), IP communication center (ICC), and an IP Server Manager (ISM), hereafter referred to as "the Exchange Managing Apparatus". The Exchange Managing Apparatus and the elements comprising the softbridge assisting in managing and conducting the Conferencing System are described in detail within the said U.S. patent application Ser. No. 11/509,253. The Exchange Managing Apparatus manages and provides establishing communications between a plurality of participants 21, 23, 25, 27 within a conference session. The Exchange Managing apparatus including the softbridge enables communication between different forms of media in a data communication network. Thus, the Exchange Managing apparatus routes, bridges, and manages integrated voice, digital data, screen sharing data, video or other multi-media streams across multiple network sites in real-time and supports multiple devices as end points. The multimedia softbridge preferably includes media services, session control, content distribution, and any device access layer. The multimedia softbridge can leverage current investment in Time Division Multiplexing and IP infrastructures of an enterprise to deliver dynamic provisioning of communication servers in real-time for virtually unlimited scalability. In some embodiments of the present invention, Initiator 20 and participants 21, 23, 25, 27 components require installation of software enabling the effective conference communication. The installation of said software is mandatory for succeeding to conduct and hold a conference session. The main software components required according to one embodiment for conducting a screen sharing sessions within a conference communication of the system for the engine and the viewer are depicted below in view of FIGS. 2A and 2B.

Figure 2A:
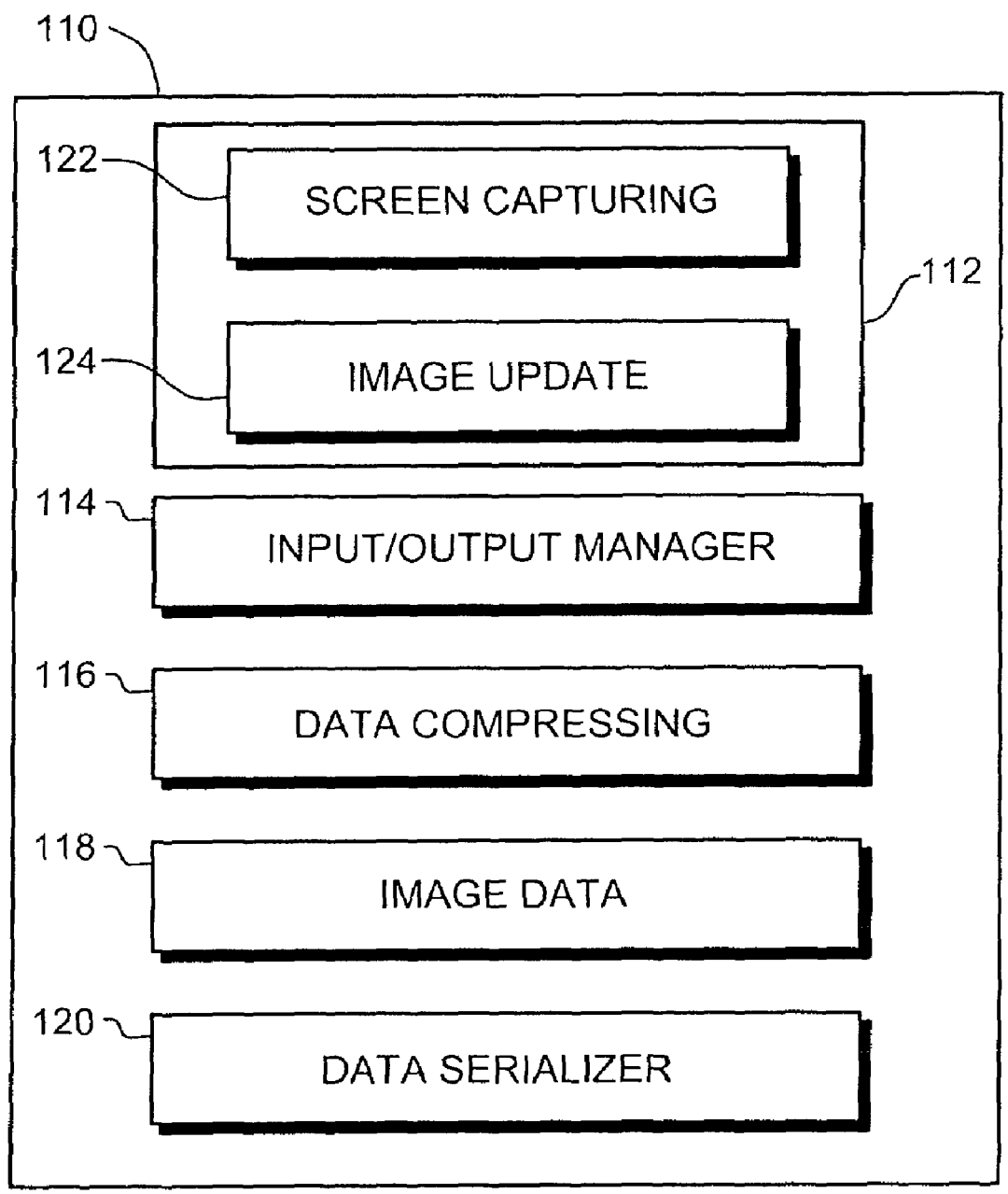
FIG. 2A is a block diagram of the operative components within an engine for conducting a screen sharing session within a conference session, according to one preferred embodiment of the present invention.
Figure 2B:
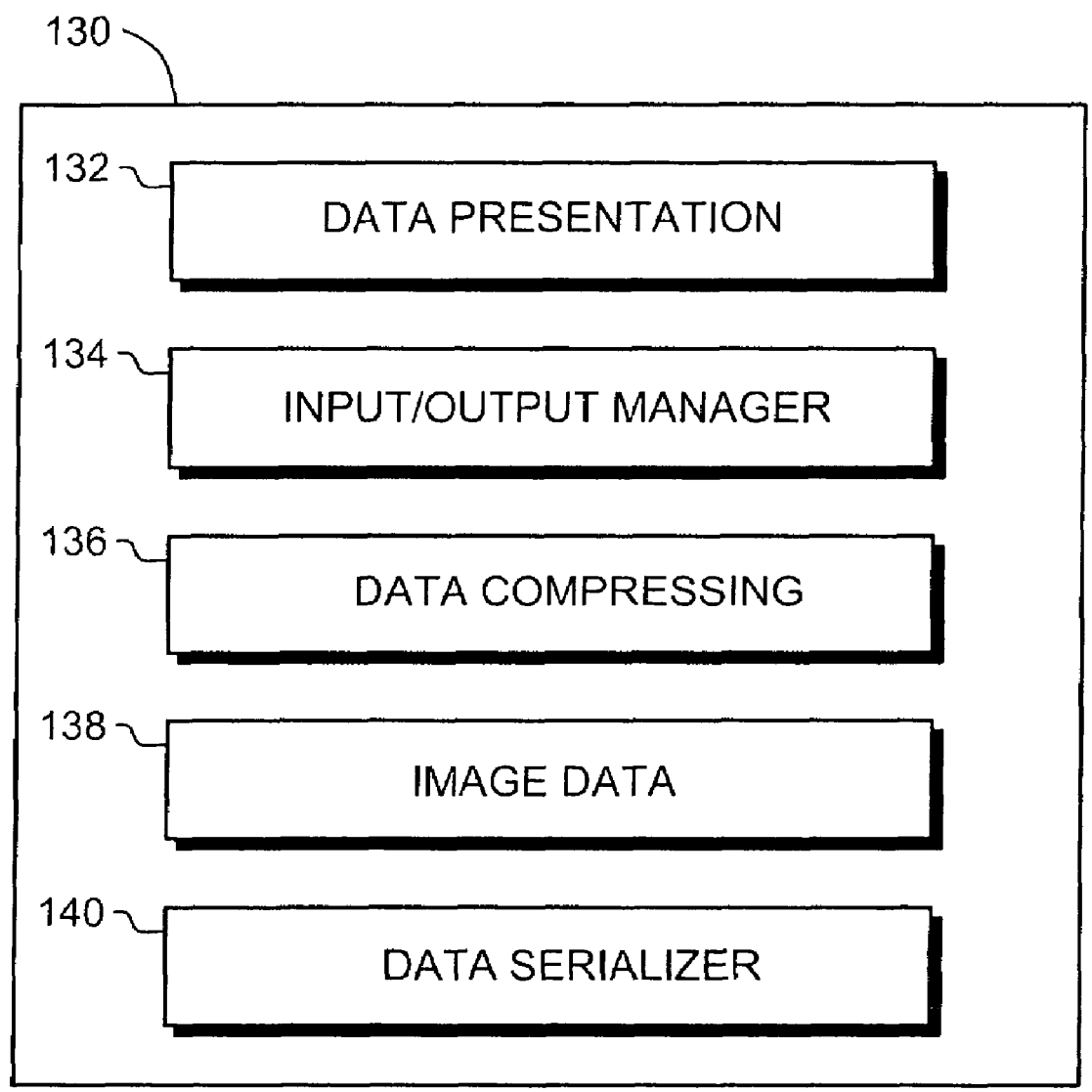
FIG. 2B is a block diagram of the operative components within a viewer for conducting a screen sharing session within a conference session, according to one preferred embodiment of present invention.

FIG. 2A is a block diagram of a presenter's conference components 110 required for conducting a screen sharing session within a conference session according to one embodiment of the present invention. The presenter's conference components unit 110 is typically located within the Presenter 20 machine shown in FIG. 1. The Presenter's conference components unit 110 comprises an engine component 112, and Input/output manager 114, a data compressing unit 116, an image data unit 118, and a data serializer component 120. The engine component 112 comprises a screen capturing unit 122, and an image update unit 124. The screen capturing unit 122 processes the screen data shared with the viewers 21, 23, 25, 27 shown in FIG. 1, and the image update unit 124 processes the update images. Thus as described below, in view of FIGS. 7A, and 7B, there is no need to send the whole screen for updating the image seen by the Viewers 21, 23, 25, 27 of FIG. 1. Thus, updates of the change of the screen will suffice to provide the viewers the updated screen. The term used for "screen" relates generally to all shared data, audio, video, combination thereof, and the like which are presented, shown or played to a user. The Input/output manager 114 controls all data received by the engine 20 and all data sent by the engine (e.g. engine 20 of FIG. 1). The data compressing unit 116 compresses and decompresses all data sent and received, respectively, by presenter 20. Image data unit 118 comprises all data relating to the updated screen, thus, all information that a user (not shown) can see of a visible screen. The data serializer unit 120 converts the image data to and from a stream of bytes that can be transferred on a data communication network. FIG. 2B is a block diagram of a viewer participant conference components unit 130 required within the typical viewer according to one embodiment of the present invention. Viewer conference components unit 130 comprises a data presentation unit 132, an input/output manager 134, a data compressing unit 136, an image data unit 138, and a data serializer unit 140. The data presentation unit 132 is a unit enabling the presentation of the updated screen received from the presenter 20 of FIG. 1. Thus, in accordance with one exemplary embodiment of the present invention, data presentation unit 132 can be implemented by providing a window or a part of a screen display showing the screen shared with presenter 20 as well as all other viewers of conferencing system at a given session. The input/output manager 134 controls all data received by the viewer such as viewers 21, 23, 25, 27, of FIG. 1. The data compressing unit 136 compresses and decompresses all data sent and received, respectively, by the viewer. The image data unit 138 comprises all data relating to the updated screen, thus, all information that a user (not shown) can see displayed on a visible screen or hear as it is played. The data serializer unit 140 converts the image data to and from a stream of bytes that can be transferred on a data communication network. Typically, the software used by Viewer conference components unit 130 is downloaded and installed to the user's computer (e.g. Webex) before participating in a conference session that involves a screen sharing session within a conferencing system. The installation of such software can be also on demand. Such software must be compatible with a Viewer computing device. Moreover, the software discussed in view of FIG. 2 must be confirmed with the security system used with the computing device, or alternatively, with the security intranet that Viewer is a part of. The Viewer conference components unit 130 shows exemplary components within a Viewer within a conferencing apparatus. A viewer conferencing computing as shown in unit 130 can comprise the units and components shown above in FIG. 2A as well. Thus, the viewer can change to be a presenter during a conferencing session.

Figure 3:
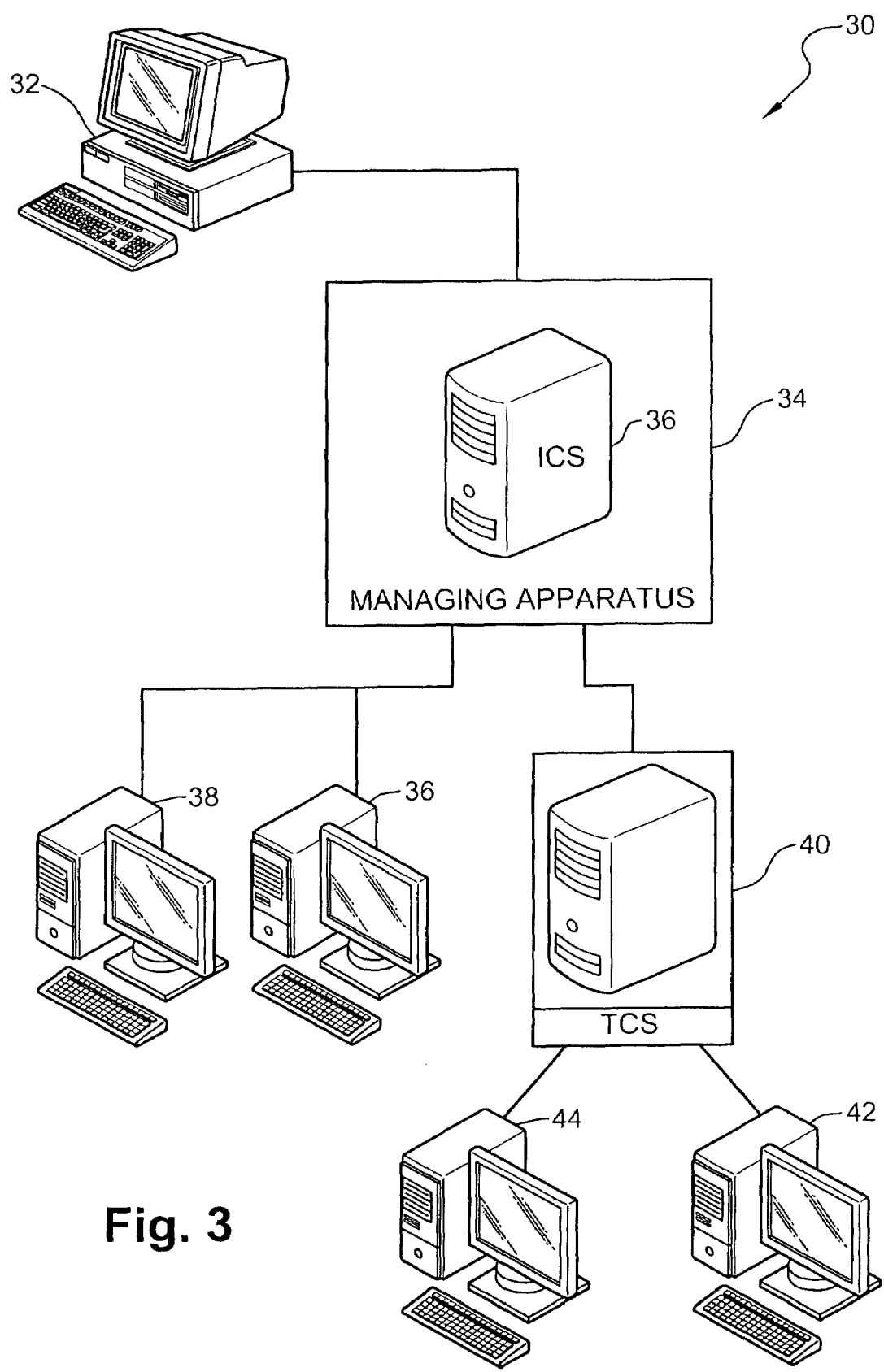
FIG. 3 is a schematic block diagram of the teleconferencing and tele-collaboration multimedia conferencing system, according to one preferred embodiment of present invention.

Referring now to FIG. 3 is a schematic block diagram of the teleconferencing and telecollaboration multimedia conferencing system 30 according to an exemplary embodiment of the present invention. Conferencing system 30 comprises presenter 32, an Exchange Managing Apparatus 34, participants 36, 38, communicating with the exchange managing apparatus 34, and participants 42, 44 connected the through a Thin Client Server (TCS) 40 to managing apparatus 34. Presenter 32 is a computing device such as shown and depicted in view of FIGS. 1 and 2A above. Exchange managing apparatus 34 comprises the same elements as depicted to the managing apparatus 22 of FIG. 1, thus resembling to the softbridge and the ICC, and ISM connected to it. One skilled in the art can appreciate that other conferencing systems with other managing apparatuses can be used as well. Participants 36, 38 are the same computing devices as depicted in view of FIGS. I and 2B above. Thus, participants 36, 38 comprise software installed comprising the elements shown in FIG. 2B. On the other hand, participants 42, 44, hereafter: "installation-free Viewers", do not comprise installed software but nevertheless are able to take part in a conference session as viewers and a screen sharing session within it. Viewers 42, 44 comprise a standard browser installed in PC computing devices such as for a non-limiting example, Firefox and Microsoft Internet Explorer. As depicted below TCS 40, referred to also as thin server 40, comprises Ajax Technology that enables participants 42, 44 a screen sharing session as part of the conferencing session of viewers 36, 38 and presenter 32 without the need for installing software of any kind. TCS 40 comprises the software elements that enable installation-free viewers 42, 44 to use a browser to view a screen captured by presenter 32. The presenter 32 is the designated user of the conferencing system whose screen display and other multi-media input is presented to the other viewers. In some embodiments of the present invention, the other viewers may also be designated as presenters or as sub presenters. By being a sub presenters the other viewers may provide captured parts of the screen display to other viewers and the presenter 32 thus allowing for combined showing of the presenter 32 screen or part thereof with a part of the screen of one or more of the viewers. In some exemplary embodiments of the present invention, some viewers, such as for example viewers 42, 44 cannot become presenters or sub presenters, while other viewers such as viewers 36, 38 can become presenters or sub presenters. Capturing screen can be done by software such as Symantec—PcAnywhere, VNC and others. Conferencing system 30 shows a situation wherein part of the viewers (i.e. 36, 38) communicate directly with exchange managing apparatus 34 and engine 32, and part of the viewers (i.e. 42, 44) communicate through TCS 40 to managing apparatus 34 and engine 32. One skilled in the art can appreciate that other conferencing systems can comprising other number of installation-free viewers, and further number of "ordinary" viewers can be part of the conferencing session. As depicted above the installation-free viewers provide a non-client dependent participant of the conference session and a screen sharing session. The installation-free viewer is a participant that is part of the multimedia conferencing apparatus session communication through a TCS. According to one exemplary embodiment viewers 42, 44 are limited to sharing data (e.g. screen sharing) and do not have the capability to act as presenters. One skilled in the art can appreciate that in other embodiments of the present invention one or more TCS can be used. Other embodiments can provide that a TCS can be located within the Exchange Managing Apparatus.

Figure 4:
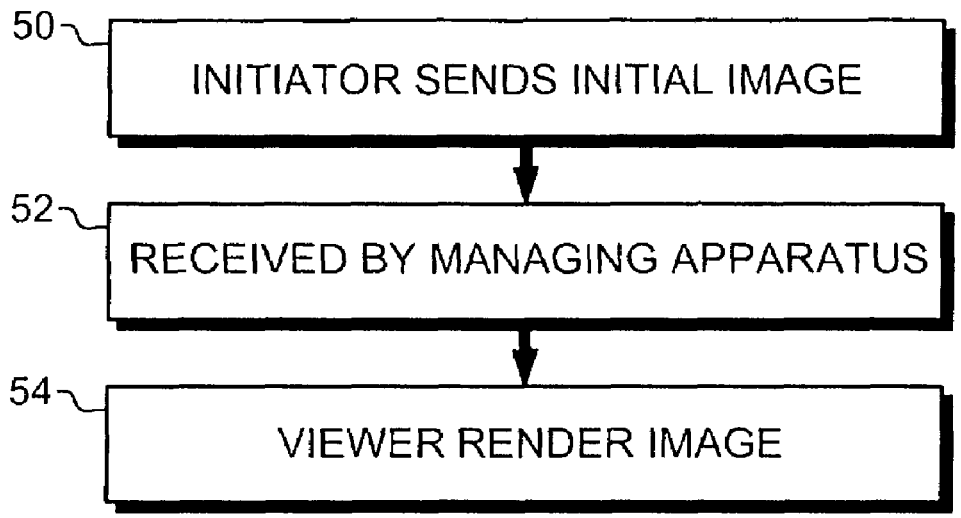
FIG. 4 is a simplified flow chart of the loading process of data provided to the viewer, according to one preferred embodiment of present invention.
Figure 5:
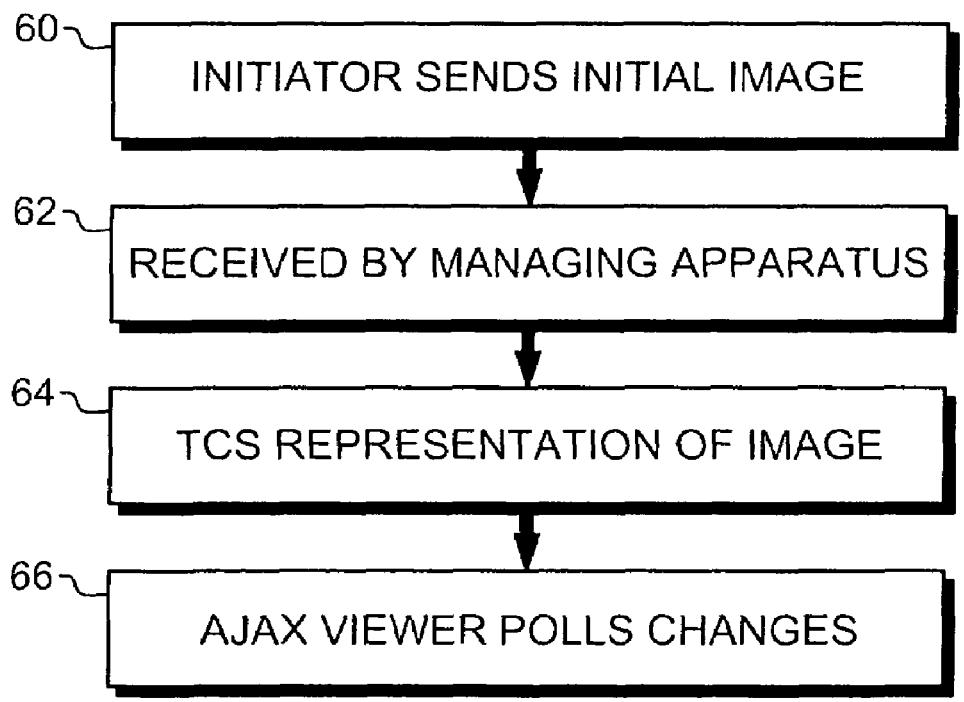
FIG. 5 is a simplified flow chart of the loading process of data provided to the viewer, according to one preferred embodiment of present invention.

FIGS. 4 and 5 are simplified flow charts showing the loading process of data provided to the viewer in a screen sharing session on the Conferencing System, and the loading process according to the exemplary embodiment of the present invention. Referring now to FIG. 4 in step 50, initiator sends initial image to the managing apparatus. Next, in step 52 the image sent the managing apparatus is received by the exchange managing apparatus 34 of FIG. 3 and said managing apparatus send the image to the various viewers, such as for example to viewers 36, 38, 42, 44 of FIG. 3. Next, in step 54 any one of the viewers render the received image. In an alternative exemplary embodiment of the present invention, instead of sending images, the initiator (later to become the presenter) send data representative of the image to be rendered. Such data is rendered by said viewers 36, 38, 42, 44. In yet another exemplary embodiment of the present invention a combination of data and images is being sent to the viewers and is rendered by said viewers. Steps 50, 52, 54 provide a simplified data streaming within multimedia conferencing session describing data exchange (e.g. audio, video) between presenter and viewer. One skilled in the art can appreciate the "initial image" referring to the first image sent by an initiator can be replaced by an "update of image" of data at other steps of communication within a conferencing session. Furthermore, steps 50, 52, 54 can refer to a presenter or to a sub-presenter during a conference session. FIG. 5 refers to a loading process of data seen by installation-free viewers. In step 60 an initiator sends an initial image to the exchange managing apparatus 34 of FIG. 3. In one exemplary embodiment of the present invention, such image is representative of the image of the screen of said initiator. In one exemplary embodiment of the present invention, such image represents a screen capture of the screen of the initiator who turns into the presenter after initiating the conferencing session. Next, in step 62 the image is received by the exchange managing apparatus and sent to the TCS. Next, in step 64 TCS 40 of FIG. 3 processes representation of said image. In step 66 AJAX viewer polls changes to said image. In step 66 the image update is provided to installation-free viewers through a browser. According to the present invention installation-free viewers can use any kind of browser fitted to communicate with the TCS. Comparing the two flow charts shown in FIGS. 4, 5, shows the difference between the conference session held with the viewers, having software installed therein, and the installation-free viewers. The installation-free viewers must communicate with TCS having an AJAX Technology or the like viewer and using an AJAX Technology or the like framework for communicating with the presenter. The AJAX Technology enables distant communication of the installation-free viewers without having actual software installed on the viewer or viewers. As mentioned above the Ajax Technology used within TCS provides a constant update of data behind the scene. The viewer polls for changes in very short intervals and when there is an update an answer that represents what was updated is returned to the viewer.

Figure 6:
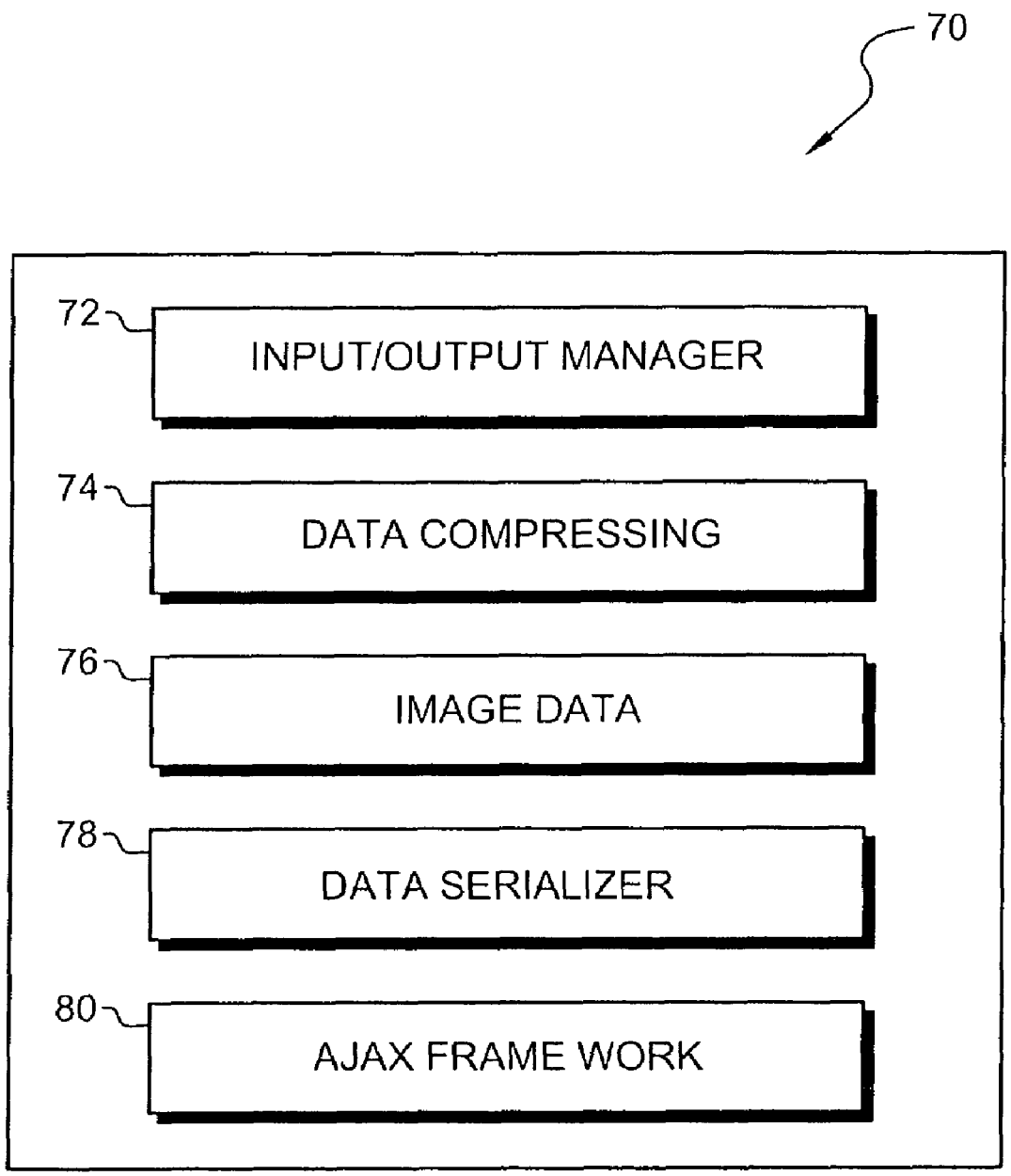
FIG. 6 is a simplified block diagram of the proposed thin client server (TCS), according to one preferred embodiment of present invention.

FIG. 6 shows the conference components within TCS 70. TCS preferably comprises an input/output manager 72, a data compressing unit 74, an image data unit 76, a data serializer unit 78, and an AJAX framework unit 80. The input/output manager 72 controls all data received by TCS 70 from the engine and exchange manager apparatus, or other viewers, and all data sent by the TCS 70 to installation-free viewers, other viewers, exchange manager apparatus, or presenter. Data compressing unit 74 compresses and decompresses all data sent and received, respectively, by the TCS 70. Image data unit 76 comprises all data relating to the updated screen, thus, all information that a user (not shown) can see, by using the viewer, on a visible screen. Such can include images or data or a combination thereof. In some exemplary embodiments, the screen and updated screens are created on said TCS 70 for viewing by installation-free viewers. In other exemplary embodiments the screen and updated screens are created by the viewers when the received data or images or a combination thereof is rendered thereon. Data serializer unit 78 converts the image data to/from a stream of bytes that can be transferred on a data communication network for transferring said image data from the TCS to the viewers. Ajax Technology framework unit 80 process the data of all images/updates of images or data or a combination thereof to a format accessible by browser for the installation-free viewers. Thus, when browsers located at the various viewers can access Ajax unit 80 and receive images and or updates of images for rendering within said browsers for presentation on said viewer. While the present invention makes reference to the term AJAX, other techniques for creating interactive web applications that enable to update the viewers images on a substantially continuous basis without the need to download specifically designed software for allowing the substantially continuous showing of a conferencing session are also contemplated by the present invention as another exemplary embodiment of the invention, and the use of the term AJAX is not designed to limit rather to provide an exemplary embodiment of the invention.

Figure 7A:
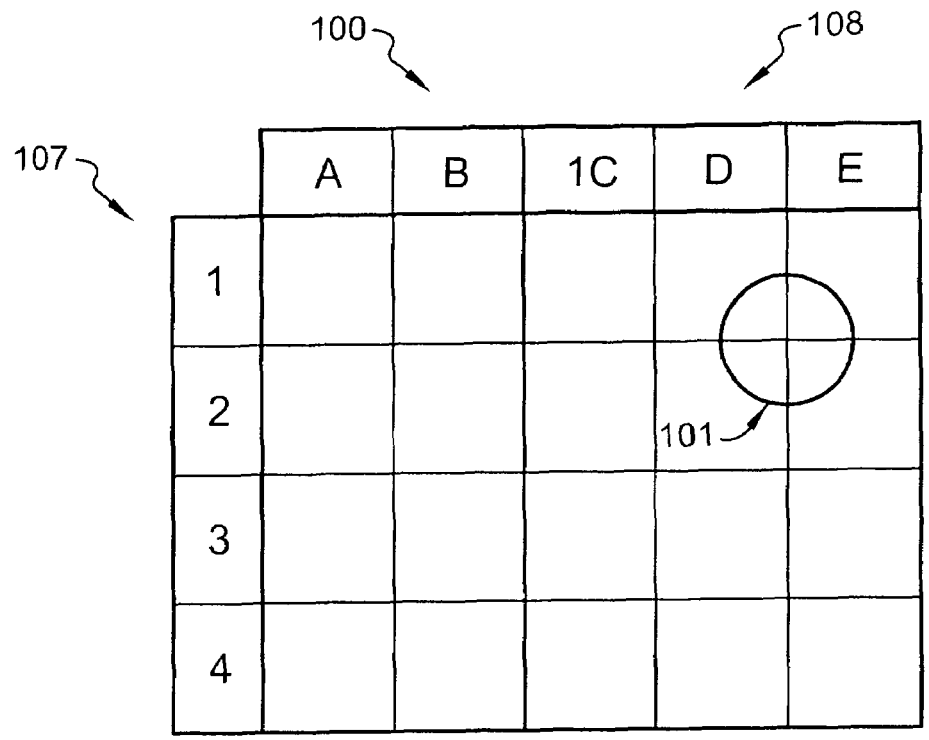
FIGS. 7A, 7B show exemplary updates sent to the TCS for updating the viewer, according to one preferred embodiment of the present invention.
Figure 7B:
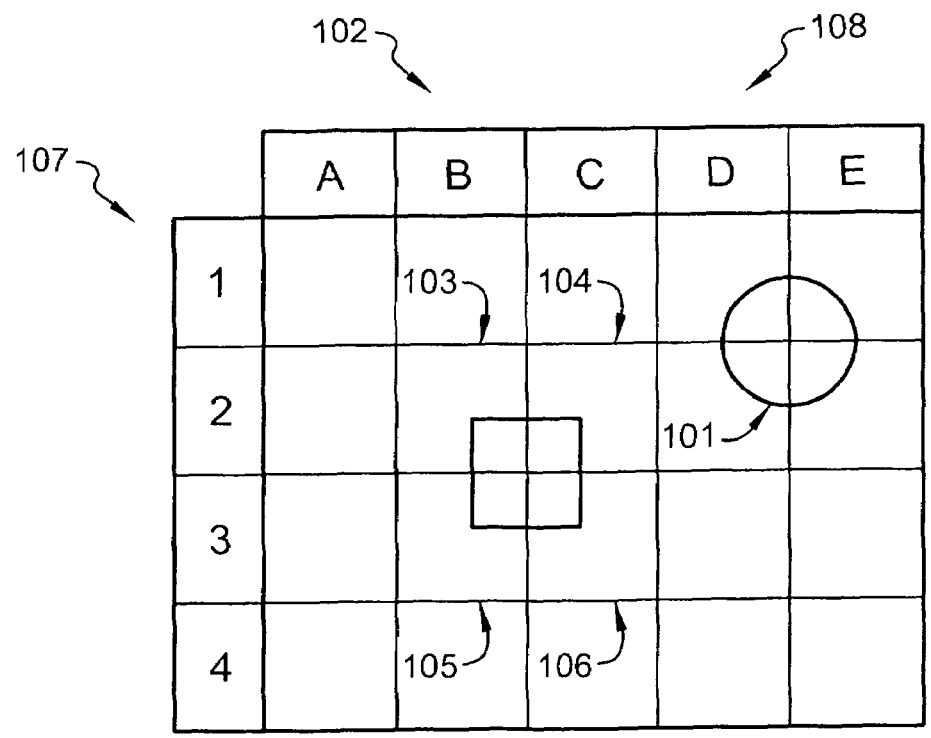

FIGS. 7A, 7B show exemplary updates sent to the TCS for updating the viewer according to one preferred embodiment of the present invention. As depicted above in view of FIG. 2A the data sent from a presenter to a viewer or viewers need not be inclusive of all the screen shared between presenter and said viewers. As also noted above in some exemplary embodiments images can be comprised of images from a presenters and part of images from sub presenters and alternatively, viewers can turn into presenters themselves. In such alternatives the screen shown to the various participants is preferably constructed at the TCS where the portions of the screens to be shown from each sub presenter are superimposed in various areas pre-selected or dynamically allocated on the presenter's image, thus creating a single image to be sent to the various participants. An initial communication between an exemplary initiator 32 and viewers 36, 38, and TCS 40 of FIG. 3 can comprise sending the entire screen data for sharing. Nevertheless, the following communication between presenter 32 and viewers 36, 38, and TCS 40 can include only updates to the initial sent screen. The advantage of sending an update only instead of the entire shared screen is evident; the less data is sent through the network enabling fast and easy communication between participants of a conferencing session. One example to an update of an initial shared screen is shown in FIGS. 7A, 7B. FIG. 7A is the initial shared screen 100. Screen 100 is subdivided in a matrix form including numbers 107 and letters 108. In other exemplary embodiments of the present invention, other divisions of the screen can be made such that additional columns or rows are added or removed and an uneven number of rows and columns or squares are used. In yet other exemplary embodiments instead of squares, other shapes can be used to define areas of the screen which will be updated. In some exemplary embodiments the size and shape of the areas to be updated for sharing or to which the screen is divided is determined according to the bandwidth available between the participants of the conference session or according to the availability of other resources which affect the presentation of the images to the participating users. In yet additional exemplary embodiments, the use of video stream, which may also include audio streams is also contemplated as a replacement for the use of images and the screen may be accordingly divided into various shapes and number of such shapes suitably allowing the presentation of the video stream in a continuous manner with our without an accompanying image. The purpose of the subdividing of screen 100 will be evident in view of the update shown in FIG. 7B. Screen 100 includes a shape 101. FIG. 7B shows the new data included in screen 102 in comparison to the initial screen 100 in FIG. 7A. As shown in FIG. 7B the new data (i.e. a square) is only in units (2,B,); (2,C,); (3,B,); (3,C,). The update sent from a presenter will include only the updated data. In some embodiments of the present invention the updates can be sent from other sources, such as from the TCS. The matrix subdivision of the screen assists to locate the updated information in the screen image data within the viewers and TCS. One skilled in the art will appreciate that the update example given above refers to simple shape can be provided to a video shared screen and any other shared screen as well.

It will be appreciated by persons skilled in the art that the present invention is not limited to what has been particularly shown and described hereinabove. Rather the scope of the present invention is defined only by the claims, which follow.

What is claimed is:

1. A method of conducting a data communication conference session, over a data communications network, among multiple participants using computing devices, comprising:
designating at least one server that serves as a managing apparatus for the data communication conference session, the at least one server being adapted to bridge among the multiple participants participating in the data communication conference session;
installing a dedicated software application on at least one computing device corresponding to at least one participant that enables the at least one participant to participate in the data communication conference session as both a presenter and a viewer;
providing a thin client server that serves as an interface that transfers data and that enables the multiple participants to participate as viewers without participating as presenters using a standard browser without installing the dedicated software application on the computing devices corresponding to the multiple participants participating as the viewers and not presenters, wherein the dedicated software application includes software applications which are dedicated to enable the participants to participate in the conference session and which allow continuous sharing of the data of the conference session;
initiating the data communication conference session by a first participant that serves as the presenter and that shares the data with the multiple participants participating as the viewers;
establishing communications between the presenter and the thin client server;
establishing communications between the viewers using the standard browser, and the thin client server; and
updating the viewers using the thin client server with the data shared by the presenter by communicating through the thin client server,
wherein the thin client server processes the data into a format accessible by the standard browser using asynchronous javascript and extensible markup language (AJAX) and transfers the data for presentation to the viewers using the standard browser,
wherein data viewable by the viewers includes a combination of the data from the presenter and data obtained from at least one of the viewers,
wherein the data obtained from at least one of the viewers is superimposed and displayed on a dynamically allocated area on a screen of a presenter's conference session corresponding to the data from the presenter such that a single screen is sent to the viewers,
wherein screens corresponding to the viewers are subdivided into a matrix such that updated data is sent to the viewers based on subdivided units of the matrix,
wherein sizes and shapes of the subdivided units are determined according to an availability of resources that affect presentation of the updated data to the viewers,
wherein the sizes and shapes of the subdivided units define areas of the screens corresponding to the viewers which will be updated, and
wherein the thin client server is implemented on the at least one server that serves as the managing apparatus.

2. The method of claim 1,
wherein the thin client server updates the viewers on a substantially continuous basis during the data communication conference session.

3. The method of claim 1,
wherein establishing communications by the viewers using the standard browser is performed periodically.

4. The method of claim 1,
wherein a bridge is implemented on the at least one server as a software application.

5. The method of claim 1,
wherein a computing device corresponding to a first participant that serves as the presenter swaps roles with a computing device corresponding to a different participant during the data communication conference session.

6. A system for conducting a data communication conference over a data communications network, comprising:
a server that serves as a managing apparatus for the data communication conference, the server bridging among multiple participants participating in the data communication conference;
at least one computing device, corresponding to at least one participant, having a dedicated software application installed, that enables the at least one participant to participate in the data communication conference as both a presenters and a viewer;
a thin client server that serves as an interface for transferring data to enable a first set of the multiple participants to serve as viewers without serving as presenters using a standard browser without installing the dedicated application software on computing devices corresponding to each of the first set of the multiple participants serving as viewers and not presenters, wherein the dedicated software application includes software applications which are dedicated to enable the participants to participate in the conference session and which allow continuous sharing of the data of the conference session; and
a second set of computing devices corresponding to a second set of the multiple participants with a standard browser installed on each of the second set of computing devices such that each of the second set of the multiple participants is enabled to serve as the viewers in the data communication conference by communicating through the thin client server,
wherein during the data communication conference, the at least one computing device with the dedicated software application installed serves as a presenter providing data to the viewers,
wherein the thin client server transfers the data provided by the presenter to each of the second set of computing devices with the standard browser installed, wherein the thin client server processes the data into a format accessible by the standard browser using asynchronous javascript and extensible markup language (AJAX) and transfers the data for presentation to the viewers using the standard browser, wherein data viewable by the viewers includes a combination of the data from the presenter and data obtained from at least one of the viewers, wherein the data obtained from at least one of the viewers is superimposed and displayed on a dynamically allocated area on a screen of a presenter's conference session corresponding to the data from the presenter such that a single screen is sent to the viewer, wherein screens corresponding to the viewers are subdivided into a matrix such that updated data is sent to the viewers based on subdivided units of the matrix, wherein sizes and shapes of the subdivided units are determined according to an availability of resources that affect presentation of the updated data to the viewers, wherein the sizes and shapes of the subdivided units define areas of the screens corresponding to the viewers which will be updated, and wherein the thin client is implemented on the at least one server that serves as the managing apparatus.

* * * * *

UNITED STATES PATENT AND TRADEMARK OFFICE
CERTIFICATE OF CORRECTION

| | | |
|---|---|---|
| PATENT NO. | : 7,953,795 B2 | Page 1 of 1 |
| APPLICATION NO. | : 11/648978 | |
| DATED | : May 31, 2011 | |
| INVENTOR(S) | : O. Keren | |

It is certified that error appears in the above-identified patent and that said Letters Patent is hereby corrected as shown below:

Col. 12, line 40
At claim 6, line 11, please change "presenters" to --presenter--.

Signed and Sealed this
Eleventh Day of October, 2011

David J. Kappos
*Director of the United States Patent and Trademark Office*